Figure 1:
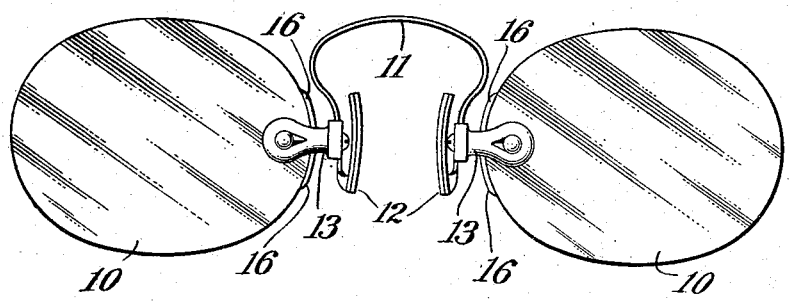

F. W. WOOD.
EYEGLASSES AND SPECTACLES.
APPLICATION FILED MAY 28, 1915.

1,213,324. Patented Jan. 23, 1917.

Inventor
Frank W. Wood
By his Attorneys
Kerr Page Cooper & Hayward

UNITED STATES PATENT OFFICE.

FRANK W. WOOD, OF NEW YORK, N. Y., ASSIGNOR, BY DIRECT AND MESNE ASSIGNMENTS, TO FLOATING WEDGE LOCK NUT CO., INC., A CORPORATION OF NEW YORK.

EYEGLASSES AND SPECTACLES.

1,213,324.     Specification of Letters Patent.     Patented Jan. 23, 1917.

Application filed May 28, 1915. Serial No. 30,875.

*To all whom it may concern:*

Be it known that I, FRANK W. WOOD, a citizen of the United States, residing at New York, borough of Manhattan, city, county, and State of New York, have invented certain new and useful Improvements in Eyeglasses and Spectacles, of which the following is a full, clear, and exact description.

The objects of my invention broadly are, by a new and improved method of my invention, to form as a new-product and article of manufacture, a male and female screw-lock-joint of exceedingly small and micrometric dimensions, of great simplicity of structure, and easily and quickly locked and unlocked; which at the same time will have but little liability to accidental loosening and consequent disarrangement of the parts secured in place thereby; and such screw-lock-joint may be used in any structure, wherein it is desired to lock firmly in place, for any purpose screws of micrometric size; and the same is peculiarly adapted for use in all instruments of precision where loosening thereof would of necessity be of great detriment; and this is true especially of optical instruments of all forms. And for this reason, I have herein shown such joint as applied to eye-glasses of pince-nez form; and as so used the same may be with equal effect applied to spectacles or nose glasses framed or unframed.

Considerable difficulty is encountered by jewelers and opticians in maintaining the glasses or lenses of eye-glasses and spectacles in tight engagement with the frame made therefor. This comes as a result of the fact that all the parts of the frame and securing means are necessarily small, light and of a more or less yielding material, offering every inducement for the ordinary screw to become loose, particularly when it is remembered, owing to the delicacy of the parts, that the screws cannot be made to engage the frame as firmly as necessary. To overcome this difficulty and annoyance manufacturing jewelers and opticians have resorted to cohesive materials as substitutes in assembling the glasses and frames. The cohesive materials used as substitutes for screws and usually made under secret processes, have proved to be equally unsatisfactory.

My improved method of forming screw-lock-joints of micrometric dimensions comprises the following steps: (1) forming a female screw-member; (2) providing such female-threaded-member either before or after threading with a side-slot of substantially round-pointed V-shape; (3) forming a lock-rod or bar of substantially round-pointed V-shaped form of less thickness at the base than the V-slot of the female-member; (4) providing the same at the base with a screw-thread adapted to coact with the male-thread as part of the female-thread, such lock-rod being of greater length than the slot; (5) forming a male screw-member; (6) inserting the end of the lock-rod in the slot; (7) screwing the male screw-member home in the female-member; and (8) cutting off the lock-rod flush with the surface of the female-member so as to leave a short lock-fin in the slot.

Figure 2:
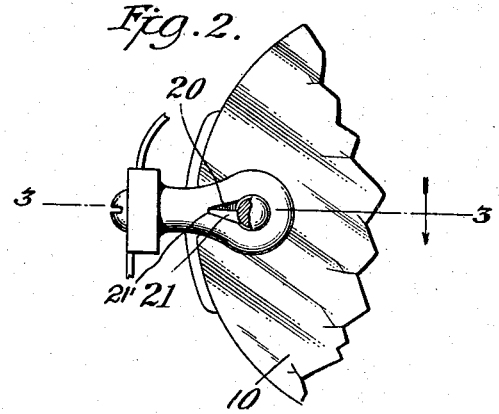
Figure 3:
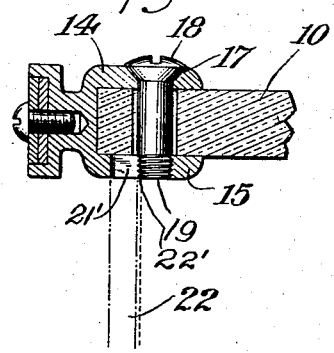
Figure 4:
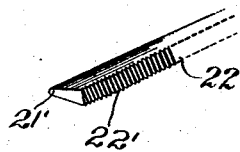

In the embodiment of the invention shown as one form of completed article or product I have shown two of such screw-lock joints as applied to nose-glasses, and in the drawing:—Figure 1 is a rear view of a pair of spectacles or eye-glasses with my invention attached thereto. Fig. 2 is an enlarged view of the same. Fig. 3 is an enlarged view on the line 3—3 of Fig. 2; and Fig. 4 is an enlarged view of stock from which the locking fin is cut.

Referring to the parts shown in the drawing in detail, the reference numeral 10 designates a pair of glasses which are connected with a bridge 11, the latter being provided with nose clamping guards 12. All these parts are, or may be, of the present conventional forms. Connecting the bridge piece 11 with each of the glasses 10 is a mounting provided with lugs 14 and 15, between which the glasses are held, as will be understood. Each of the mountings is provided with ears 16 to avoid lateral movement of the glasses when properly assembled on said mounting. One of the lugs, say 14, is provided with a circular perforation 17 to receive the screw 18, while the lug 15 is provided with a screw threaded perforation 19 adapted to receive the screw-threaded end of the screw 18. At one side of the perforation 17 is cut a V-shaped slot 20, by an instrument especially provided for that purpose, which is adapted to receive a suitable screw-locking and securing-fin 21 cut from suitable stock 22, as indicated more clearly in Figs. 3 and 4, having on the base the screw-threads 22.

In actual use the screw 18 very frequently becomes loose, and the result is that the spectacles must be taken to the jeweler for proper tightening and adjustment. Furthermore, in this loose condition the holes become enlarged or elongated and the glasses get out of proper focus, which proves an injury instead of aid to the eyes. In order to overcome this loosening tendency of the screw 18, I provide the same with the fin 21, the tapered edge of which bears in the lower portion of the V-shaped slot 20, while the outer edge of the same is provided with the screw-threads 22' which, in normal position, constitute continuations of the mutilated screw threads in the main portion of the perforations 19. The fin is sufficiently small to have a rocking movement in the V-shaped slot upon its bearing edge or point 21'. In moving the screw 16 home the screw threaded fin assumes the position shown in Fig. 2; on the other hand any tendency of a reverse movement of the screw 16 results in a slight rocking movement of the fin 19, which locks it against unscrewing. In assembling it is always best, though not necessary, to move the screw up quite tight and then give it a slight reverse movement which will cause a very effective engagement between the fin and screw, and if "forced" will result in a stripping of the threads. It is therefore apparent that, except for most extraordinary use, the screw cannot be loosened after once it is placed in normal position.

Owing to the extremely small thickness of the lug 14, it is impossible to assemble the fin if it is cut previously to proper dimensions, except at expense of great time and trouble. The fin is therefore sold to the jewelers in bars, such as indicated at 22 in Figs. 3 and 4. The screw-threaded end of this bar is properly inserted in the V-shaped slot 18 in alinement with the mutilated screw-threads of the perforation 19; the screw is then advanced home and then the fin is cut, of suitable length, from the stock 22.

After the screw has been assembled and in locking engagement with the fin it is impossible to remove the same except by a suitable instrument, in possession of the jeweler, which must be inserted behind the fin to force the latter back to the position shown in Fig. 2. Of course the fin drops out as soon as the screw is removed, and as it is so minute it is extremely difficult, if not impossible, to use it again. At any rate, to assemble it again would prove to be a very tedious operation. It is a very simple operation, however, and the cost is practically *nil*, to take the bar 22, insert the end thereof in position in the V-shaped slot, as before described, and cut off another fin of the proper length.

The bars 22 are manufactured in suitable lengths and other dimensions and are sold to the jewelers and opticians in quantities.

I claim:—

1. The hereinbefore described method of forming lock-joints of micrometric dimensions, comprising the following steps: (1) forming a bar or rod that has the characteristics of a locking detent; (2) inserting that rod or bar in the recess of a nut; and (3) cutting off the surplus of the bar.

2. The hereinbefore described method of forming lock-joints of micrometric dimensions, for use in spectacle frames, comprising the following steps: (1) forming a bar or rod that has the characteristics of a locking detent; (2) inserting that rod or bar in the recess of a nut; and (3) cutting off the surplus of the bar.

In testimony whereof I affix my signature.

FRANK W. WOOD.

Copies of this patent may be obtained for five cents each, by addressing the "Commissioner of Patents, Washington, D. C."